March 31, 1925.  1,531,832
J. F. BATES
DEVICE FOR PREVENTING DAMAGE DUE TO BACK FIRING
IN INTERNAL COMBUSTION ENGINES
Filed June 19, 1923
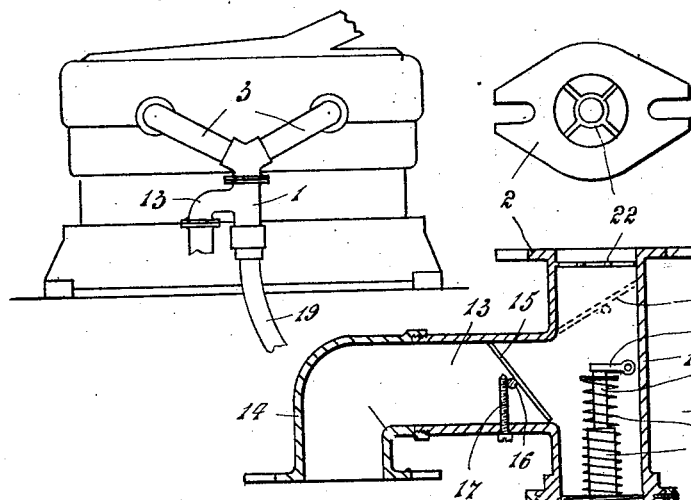
Inventor:
James Frenrick Bates
By [signature]
att.

Patented Mar. 31, 1925.

1,531,832

UNITED STATES PATENT OFFICE.

JAMES FRENRICK BATES, OF BELMONT, WELLINGTON, NEW ZEALAND.

DEVICE FOR PREVENTING DAMAGE DUE TO BACK-FIRING IN INTERNAL-COMBUSTION ENGINES.

Application filed June 19, 1923. Serial No. 646,399.

*To all whom it may concern:*

Be it known that I, JAMES FRENRICK BATES, a subject of the King of Great Britain and Ireland, residing in Belmont, Lower Hutt, Wellington, New Zealand, have invented a new and useful Improvement in Devices for Preventing Damage Due to Back-Firing in Internal-Combustion Engines; and I do hereby declare the following to be a full, clear, and exact description of the same.

My invention relates to devices for preventing damage due to back firing in internal combustion engines.

The object of the present invention is to permit the hot gas or flame which is the product of the back-fire to escape into the atmosphere without coming into contact with the carburettor or vaporizer, and thus prevent gas or fuel in any of the parts connected to the induction pipe being ignited.

Accordingly, the device consists of a pipe having flanges for attachment to the induction pipe of the engine. At the other end of the pipe a valve seating is formed for a safety valve, the stem of which passes through a guide screwed or otherwise fixed in the pipe. The valve is normally held upon its seat by a suitable coil spring. A branch pipe leads from said pipe for attachment of the pipe leading from the carburettor or vaporizer. Within this branch pipe one or two automatic self-closing check valves are employed in order to prevent back fire from the engine reaching the tank. When back firing takes place the sudden spurt of flame or gas will open the safety valve but will close the self-closing check valves, thus preventing any back-fire from reaching the fuel tank.

The invention will now be described with the aid of the accompanying drawings, wherein:—

Figure 1, is an elevational view showing the device in position.

Figure 2, is a vertical section of the device.

Figure 3, is a plan of a detail.

Figure 4, is a vertical section of the valve and seating.

Figure 5, is a plan of the valve.

Figure 6, is a horizontal section showing means for opening the valve to admit air when required.

The device consists of a pipe 1 having a flange 2 for attachment to the induction pipe 3 of the engine. Within pipe 1 an induction control valve 4 may be pivoted and controlled by a lever from a part convenient to the operator. At the other end of the pipe a valve seating 5 is formed for a safety valve 6. This valve seating is preferably screwed into the end of the pipe and has a socket 7 in which the valve stem 8 is guided. A coil spring 9 located upon the socket is in compression between the socket and a washer 10 upon the valve stem. The seating 5 is cupped or hollowed so as to provide a space 11 between the valve and the socket while the portion joining the socket to the wall of the seating is provided with holes 12 of the greatest area available. The valve 6 is of the flat headed type and is ground in upon the seating. Another pipe 13 leads at right angles from the main pipe 1 for attachment to the source of supply of the gaseous fuel and for this purpose the drawing shows a flanged union 14 for attachment to a carburettor. Within this branch pipe 13 one or two automatic self-closing check valves 15 are employed in order to prevent back-fire from the engine reaching the carburettor. These valves are preferably of the butterfly type and are pivoted on a pin 16 located at a position so that they tend to close by gravity but will open to allow the gaseous fuel to pass into the main induction pipe of the engine. A pin 17 screwed through the wall of the pipe 13 prevents the valve 15 from opening to such an extent that it would not easily return by gravity. When back-firing takes place, the pressure is upon the opposite side of the valves 15 and will tend to retain such valves closed. The sudden spurt of flame or hot gas from the back-fire will open the safety valve 6 and allow the hot gas to escape into the atmosphere, thus the passing of any flame or hot gases back along the induction pipe reaching the carburettor, fuel tank, or other parts is obviated.

An orifice 18 in the wall of the seating 5 prevents the formation of a vacuum within the seating due to the suction of the engine, and thus opening of the valve 6 will not be retarded.

An outlet pipe 19 is attached to the end of the pipe 1 by means of a chamber 20 screwed to the pipe 1 and secured in position by means of a screw 21 brazed in position so that the valve 6 cannot be interferred with. Webs 22 are formed or fixed in the upper end of the pipe 1 so that the interior of the device cannot be easily interfered with.

In order to enable the valve 6 to be employed to provide extra air to the mixture when required, such valve can be operated by a lever 23 fixed to a spindle 24 mounted in the pipe 1. The spindle 24 may be operated by any suitable means, the drawings showing a lever 25 fixed thereto.

I claim as my invention:

1. In an internal combustion engine, the combination with the induction pipe, of a main pipe having means at one end for attachment to said induction pipe, a socket screwed into the other end of said main pipe, a valve seating formed on said socket, a spring controlled valve normally held seated upon said socket, a branch pipe extending at right angles from said main pipe for attachment to the source of mixture supply, a gravity operated valve or valves within said branch pipe to open in one direction only, a hollow space formed in said socket behind said valve, and an orifice in said valve seating to allow air to enter said hollow space.

2. In an internal combustion engine, the combination with the induction pipe, of a main pipe having means at one end for attachment to said induction pipe, a valve seating provided at the other end of said main pipe, a spring controlled valve normally held seated upon said valve seating, a branch pipe extending at right angles from said main pipe for attachment to the source of mixture supply, a gravity operated valve or valves within said branch pipe to open in one direction only, and means for opening said spring controlled valve to admit air to said main pipe.

3. In an internal combustion engine, the combination with the induction pipe, of a main pipe having means at one end for attachment to said induction pipe, a valve seating provided at the other end of said main pipe, a spring controlled valve normally held seated upon said valve seating, a branch pipe extending at right angles from said main pipe for attachment to the source of mixture supply, a gravity operated valve or valves within said branch pipe to open in one direction only, a chamber secured to the valve end of said main pipe, and an outlet pipe extending from said chamber.

In testimony whereof, I have signed my name to this specification in the presence of two subscribing witnesses.

JAMES FRENRICK BATES.

Witnesses:
 SYDNEY H. HIGGS,
 E. P. O'DONNELL.